3,268,481
UPGRADING OF HEAVY RESIDUES FROM ISO-
PRENE MANUFACTURE BY REACTING SAID
RESIDUES WITH MALEIC ACID OR MALEIC
ANHYDRIDE
Moise Lerer, Paris, France, assignor to Institut Francais
du Petrole, des Carburants et Lubrifiants, Rueil Mal-
maison, France
No Drawing. Filed Nov. 28, 1961, Ser. No. 155,481
Claims priority, application France, Nov. 30, 1960,
845,693
2 Claims. (Cl. 260—75)

The present invention relates to new esters obtained by the treatment of residues formed in a process for converting monoolefins to alkylmetadioxanes.

One of the most advantageous processes known in the art for manufacturing alkylmetadioxanes comprises condensing monoolefins with formaldehyde in the presence of acid-acting catalysts, under moderate temperature, in most cases lower than 100° C. Such a process has already been described, for instance, in U.S. Patents 2,962,507 and 2,997,480 and in this type of process, in addition to the main reaction products comprising alkylmetadioxanes formed by condensation of two moles of formaldehyde with one mole of the monoolefin, there are obtained by-products of higher boiling temperatures which by-products result from side reactions. Said by-products appeared to form a residue of low industrial value which, up to the present could not be converted to valuable products.

These residues will be designated hereinafter by the term "heavy residues," in view of the fact that their boiling temperature is higher than that of the substituted metadioxanes obtained as the main reaction product in the above-mentioned process. Moreover, the term "heavy residues" is also used hereinafter to designate any fraction as well as the entirety of the reaction products which are less volatile than the substituted metadioxane, said fractions being separated for instance by fractional distillation and/or extraction by means of water or organic solvents.

Among the various alkylmetadioxanes obtainable by said condensation processes the most interesting, from an industrial point of view, are the 4-methylmetadioxane obtained by condensation of one mole of propene with two moles of formaldehyde and the dimethylmetadioxanes, and more particularly 4,4-dimethylmetadioxane, the boiling temperature of which is close to 133° C. at atmospheric pressure, and which is produced by condensation of one mole of isobutene with two moles of formaldehyde. Thus, in the case where the main reaction products are dimethylmetadioxanes, the so-called heavy residue comprises by-products boiling above 133° C. at atmospheric pressure.

The heavy residue content of the reaction products is of considerable economic interest, particularly if it is possible to convert any amount of the heavy residue to valuable products, thereby reducing the manufacturing cost of the substituted metadioxanes obtained as the main reaction product.

It is therefore an object of the present invention to prepare from these heavy residues, valuable products having a wide field of applicability.

It is another object of this invention to convert said heavy residues to esters which may be used, according to their degree of condensation, in the form of more or less viscous liquids or solid resins, as drying oils, as a base for paints and varnishes, either alone or in admixture with other conventional ingredients used in coating compositions for the usual materials of construction, such as, wood, iron, plaster etc., these novel esters, like other drying oils becoming hard and resinous upon contact with air.

It is still another object of this invention to convert said heavy residues to esters which may be subjected to polymerization or co-polymerization with other polymerizable monomers, such as, styrene, allyl terephthalate, allyl and ethyleneglycol carbonate and the like, which results in the formation of thermosetting or thermoplastic resins having the same fields of application as the presently known resins of the polyester type, and usable for instance in the manufacture of molded or laminated articles.

It is a further object of this invention to recover, by treatment of said heavy residues, such valuable products as diolefins, metadioxanes, formaldehyde which may be recycled in the process for making metadioxanes, and dihydropyrans, which may be used as starting materials for the manufacture of conjugated diolefins, for instance, by thermal decomposition of the same in the presence of acid catalysts.

Still other objects and advantages will become apparent upon further study of the specification and appended claims.

These objects are achieved by subjecting the heavy residues, as such, to an esterification treatment with olefinic acids or their functional derivatives, or preferably first conducting preliminary conversion of the heavy residue to the corresponding hydrolyzed products and then subjecting the hydrolyzed products to the esterification treatment. Such an esterification treatment results in the formation, in addition to the above-mentioned esters, of formaldehyde and other substances such as, in the case of the residue of isobutene-formol condensation, 4,4-dimethylmetadioxane and 4-methyl-5,6-dihydro-(2H)-pyran, the last two products being suitable as raw materials for the manufacture of isoprene by the process of heating said raw materials to a relatively high temperature, preferably in the presence of acid catalysts, such as, for instance, phosphoric acid or a phosphate deposited on a carrier.

The esterification of the heavy residues or the corresponding hydrolyzed products by means of olefinic acids or their functional derivatives may be carried out in a conventional manner and for instance, according to the process described by Kirk and Othmer in Encyclopedia of Chemical Technology, 5, 776–814 (1950), Interscience Publishers. By functional derivative of an olefinic acid is meant any carbonylated or carboxylated compound known as a substituent for said acid in an esterifying reaction, for example, an acid anhydride, an acid chloride, an ester of an alcohol or a polyalcohol of low molecular weight, an amide, an imide, etc., said list being non-limitative.

The acids used, alone or in combination, may be either the monobasic type, such as, for instance, oleic acid, linoleic acid, or ricinoleic acid, or the polybasic type, such as, for example, maleic acid or fumaric acid. Whatever their type, they may be either acyclic as the above-mentioned acids, or cyclic as in the case of rosin and the acids contained therein, for example abietic acid.

In general, these acids may contain per molecule 3–24 carbon atoms, preferably 4–18; and 1–4 double bonds, preferably 1 or 2; and 1–6 carboxylic groups or functional derivatives thereof, preferably 1 or 2. Other olefinic acids, however, are not intended to be precluded.

The olefinic acids or their functional derivatives are added in sufficient amounts to the heavy residues to upgrade the properties of the heavy residues. In general, based on 100 parts by weight of heavy residue, there are added 5–500, preferably 10–70 parts of the acid or acid derivative.

The esterification is carried out by contacting the reactants at a sufficiently high temperature to result in a satisfactory reaction rate, for instance, at about 100 to 300° C. when the esterifying agent is an acid, lower temperatures being applicable to the more reactive esterifying agents such as acid chlorides, for example room temperature or lower.

Esterification catalysts may also be used to increase the rate of reaction. There may be used, for instance, a strong acid, such as sulfuric acid, a metal oxide or hydroxide, such as soda or potash, an acid-acting salt particularly a sodium or potassium acid sulfate or phosphate, a dehydrating agent such as zinc chloride and the like.

The volatile compounds formed during the reaction, particularly the formaldehyde, the hydrocarbons, the metadioxanes and the dihydropyrans, are generally released, at least partly, from the reaction medium. In addition to these compounds, there may be evolved from the reaction medium other products, the nature of which depends on the type of esterifying agent used. In the case where the esterifying agent is an acid, an acid chloride, an ester, an amide, etc., there are evolved respectively water, hydrochloric acid, an alcohol, ammonia, etc. The liberation of volatile products may be facilitated by carrying away the same by means of an inert carrier gas or of a compound which forms azeotropic mixtures with said products.

After separation of the volatile products formed during the reaction, the remaining liquid or resin comprises at least partly, of the esters according to this invention. These volatile products can be separated by various liquid-liquid separation techniques such as solvent extraction and distillation. When these volatile products are separated by distillation, the remaining distillation residue generally boils higher than 133° C. at 760 mm./Hg, preferably higher than 200° C. at 760 mm./Hg. The volatile products may be recycled to the process for making isoprene, and the distillation residue comprising the drying oils may be used as such or may be subjected to conventional treatments of washing, neutralizing by means of basic substances, decolorizing, etc.

The stage of evolution of the reaction may be easily determined at any moment either by measuring physical characteristics of the reaction mixture such as its viscosity, density or refraction index, or by chemical tests, carried out periodically on samples from the reaction mixture, such as, for instance, acidity determination tests.

Instead of reacting the heavy residues directly with the esterifying agents, it is preferred to first hydrolyze the heavy residues to obtain products having a high hydroxyl number. This hydrolysis step can be conducted, for example, by immersing said heavy residues in an acidic aqueous medium, pH of about 0–6, preferably 1–5, at sufficiently high temperatures to realise an economically practical rate of reaction, e.g. about 20–250° C., preferably 50–180° C. These hydrolyzed products, per se, have a somewhat limited use as filler materials and adhesives, but when they are utilized as reactants in the esterification reaction, they result in excellent drying oils, etc.

It must be understood that, in carrying out the present process, there may be added to the reactants other compounds having either drying oil properties, per se, or which are convertible to drying oils by esterification or trans-esterification. There may be added to the reaction medium, for instance, alcohols, olefinic esters and particularly drying oils, such as linseed-oil, castor oil, preferably in a dehydrated form or China-wood oil, etc.

There may also be introduced into the reaction medium saturated compounds which, either by themselves or after a chemical transformation, may act as a diluent or a plasticizer for the drying oils. Such compounds are, for instances, xylene or diphenyl chlorinated derivatives.

The esters of this invention can also be cross-linked with conventional cross-linking agents, such as those containing at least one double bond unsaturation, particularly those compounds wherein the double bonds are attached to the terminal carbon atoms. The preferred cross-linking agents of this invention are styrene, allyl terephthalate, allyl and ethylene glycol carbonate. For a more comprehensive but still incomplete list of cross-linking agents that can be used in this invention, reference is directed to "Polyesters and Their Application," Bjorksten Research Laboratories, Reinhold Publishing Corporation, New York; Chapman and Hall, Limited, London, 1956, index on page 591, and pages 28–32 in particular.

For the process conditions to effect this cross-linking reaction, reference is again directed to the general teachings of this same book. The preferred conditions according to this invention are contacting as ester of this invention with a polymerizable monomer, for example styrene, in the presence of a conventional polymerisation or copolymerisation catalyst, for example ultra-violet light, a metallic salt, such as a cobalt or manganese salt, an oxidizer, such as oxygen, ozone or benzoyl hydroperoxide, a chemical initiator such as azobisisobutyronitrile, and the like. The best results are obtained with catalystic amounts of both a peroxyde, such as methylisobutylketone peroxide or benzoyl peroxide, and a cobalt salt, such as cobalt octanoate or cobalt linoleate.

The following proposed specific embodiments are not to be considered as limitative of the scope of this invention in any way, but merely illustrate the process in greater detail.

In these examples the hydroxyl number has been determined by acetylation of one gram of the product by means of an excess of acetic anhydride in pyridine, followed by the hydrolysis of the unconverted acetic anhydride and the determination with potash of the amount of the so-liberated acid. The hydroxyl number will be defined as the number of milligrams of potash corresponding to the amount of acetic acid combined in the form of the ester.

Example 1

In a 2 liter round-bottomed flask there is refluxed for two hours a mixture comprising 1 kg. of the heavy residue as obtained according to U.S. Patent 2,962,507, having a hydroxyl number of 113, and 150 g. of maleic anhydride. This mixture is then distilled at a temperature not in excess of 250° C.

The distillate from the distillation consists of two liquid phases: an upper phase of 165.5 g. containing in particular 4.9 g. of formaldehyde, 35 g. of 4-methyl-5,6-dihydro-(2H)-pyran and 10 g. of 4,4-dimethylmetadioxane, and a lower phase weighing 178.8 g. and containing, in particular, 4,4-dimethylmetadioxane, 4-methyl-5,6-dihydro(2H)-pyran and 35.8 g. of formaldehyde.

The distillation residue, amounting to 772.5 g. is in the form of a semi-solid resin at normal temperature and has an acid index of 39, the acid index being measured by the weight of potash, expressed in milligrams, which is required for neutralizing 1 g. of the product. Dissolved in an organic solvent such as, for instance, the dioxane, said resin forms a varnish of good adhesiveness towards such materials as, for example, wood, metals and the like.

Example 2

In a 2 liter round-bottomed flask under an atmosphere of carbon dioxide, there is heated for four hours, at 155–165° C., a mixture comprising 1 kg. of heavy residue having a hydroxyl number of 113, 315.1 g. of maleic anhydride, and 0.6 g. of anhydrous zinc chloride. While maintaining the gaseous phase of carbon dioxide, the mixture is distilled under a temperature not in excess of 205° C.

The distillate obtained, in an amount of 251 g., has substantially the same constituents as that obtained in Example 1.

The distillation residue, amounting to 986.4 g. consists of a solid resin at normal temperature conditions, and has an acid index of 119. This resin has the same field of application as that obtained according to Example 1.

*Example 3*

100 g. of the resin obtained according to Example 2 are heated for two hours at 155–165° C. in admixture with 100 g. of a heavy residue of the same type as that used as a starting material in Example 2. By distillation of the resulting liquid under a temperature not in excess of 200° C., there is obtained 29.2 g. of a distillate having substantially the same constituents as that obtained in Example 1.

The distillation residue, amounting to 165.4 g. is a normally semi-solid resin having an acid index of 48. Said resin has the same types of use as those obtained according to Examples 1 and 2.

*Example 4*

In a two liter round-bottomed flask, there is refluxed for 2 hours and fifteen minutes a mixture comprising 1 kg. of heavy residue having a hydroxyl number of 113, 300 g. of maleic anhydride and 500 g. of linseed oil. This mixture is then distilled under an atmosphere of carbon dioxide at a temperature not in excess of 200° C. The distillate, amounting to 190 g. has substantially the same constituents as that obtained according to Example 1.

By a further distillation under a reduced pressure of 4 mm. mercury, absolute, there are recovered an additional amount of 150 g. of distillate. The residue obtained at the end of this latter distillation step, amounting to 1,445 g., consists of a solid resin having an acid index of 40 and the same field of application as the resin obtained according to Example 1.

*Example 5*

In a 2 liter round-bottomed flask, there is refluxed for two hours, 315 g. of maleic acid in admixture with 1 kg. of hydrolyzed product (hydroxyl number equal to 360) resulting from the hydrolysis of a heavy residue of the same type according to Example 1, said hydrolysis being carried out by means of a 0.1 N aqueous solution of sulfuric acid, at a temperature of about 120° C.

The resulting product is then distilled at a temperature maintained lower than 200° C. The distillate, amounting to 254 g. comprises essentially, as in the case of Example 1, formaldehyde, 4,4-dimethylmetadioxane and 4-methyl-5,6-dihydro-(2H)-pyran.

The distillation is continued under a reduced pressure of 2 mm. mercury, absolute, and the residue recovered at the end of this distillation, amounting to 939 g., consists of a solid resin having an acid index of 112 and the same field of application as the resin obtained according to Example 1.

*Example 6*

In a 2 liter round-bottomed flask, there is refluxed for 5½ hours 1 kg. of hydrolyzed product (hydroxyl number equal to 430), in admixture with 558.4 g. of maleic anhydride and 503 ml. of benzene.

The resulting liquid is then distilled first under atmospheric pressure and thereafter under a reduced pressure of 2 mm. mercury, absolute, the upper temperature limit of the liquid being 195° C. There are thus obtained 1,140 g. of distillate containing essentially formaldehyde, 4,4-dimethylmetadioxane, 4-methyl - 5,6-dihydro - (2H)-pyran and the recovered benzene.

The distillation residue, amounting to 855 g. consists of a solid resin having an acid index of 121 and a field of application which is the same as for the resins obtained according to Example 1.

*Example 7*

In a 2 liter round-bottomed flask there is heated for seven hours 1 kg. of heavy residue having an hydroxyl number of 113 in admixture with 150 g. of maleic anhydride, 1 kg. of xylene and 1 g. of anhydrous zinc chloride. The resulting liquid is distilled under atmospheric pressure at a temperature not in excess of 210° C. and there are thus recovered 1.090 g. of a distillate. The distillation is then continued under a reduced pressure of 21 mm. mercury, absolute, the liquid being maintained at a temperature lower than 150° C.

The distillation residue, amounting to 910 g. consists of a fluid resin having an acid index of 49, which has the same uses as the resin of Example 1.

*Example 8*

A mixture of 80 parts by weight of the resin obtained according to Example 6 with 20 parts by weight of styrene, 1 part by weight of cobalt octanoate having a 6% by weight cobalt content and 1 part by weight of a 60% solution of methylisobutylketone peroxide is maintained at ambient temperature until coagulation begins. Wood fiber is impregnated with said mixture and the resulting conglomerate is heated to 100° C. for one hour. There is thus obtained hard and infusible impregnated wood.

*Example 9*

100 g. of the resin obtained by Example 5 are mixed with 34 g. of dioxane, 5 g. of polychlorodiphenyl as a plasticizer, 1 g. of cobalt octanoate containing 6% cobalt, and 2 cc. of toluene containing 1% by weight of silicone and 1% paraffin. This mixture results in a lacquer which can be applied onto diverse materials, notably on wood, thereby yielding brilliant dry films. The lacquer can be dried very quickly by the addition of heat, for example at 80° C.

By ading 200 g. of minium to the foregoing described lacquer, there is obtained a paint which is highly effective for the protection of metals against corrosion.

*Example 10*

To 100 g. of the fluid resin obtained by Example 7 are added 2.5 g. of polychlorodiphenyl, 6 cc. cobalt octanoate having 6% cobalt by weight, 2 cc. of toluene having 1% silicone and 1% paraffin, 5 g. of monoethylether of diethylene glycol, and 8 g. yellow ocher. This mixture yields a yellow paint having excellent resistance to atmospheric conditions.

*Example 11*

To 42 g. of the resin obtained by Example 1, there is mixed 7.5 g. styrene, 5 cc. of peroxide of methylisobutylketone and 5 cc. of cobalt octanoate having 6% by weight of cobalt. A sample of the resulting mixture is heated to 80° C. for 1½ hours, whereby it is transformed into a very hard solid.

Glass fiber impregnated with another sample of the above described mixture is heated in a press to 80° C., thereby obtaining a very hard laminate which is exceptionally resistant to impact.

*Example 12*

Example 11 is repeated, substituting the resin of Example 5 for the resin of Example 1. Substantially the same results are obtained.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably and intended to be within the full range of equivalence of the following claims.

What I claim is:

1. In a process for the production of resinous maleic esters, 4,4-dimethylmetadioxane and 4-methyl-5,6-dihydro-(2H)-pyran, the step which consists in reacting an esterifying member selected from the group consisting of maleic acid and maleic anhydride with a heavy residue obtained by condensing one mol of isobutene with two mols of formaldehyde at between ambient temperatures and 85° C., under a pressure of at least one atmosphere, and in the presence of acid-acting catalysts, isolating the resulting 4,4-dimetadioxane and leaving a heavy residue boiling above 133° C. at atmospheric pressure.

2. The process of claim 1, wherein the mixture of esterifying member and said heavy residue is heated to distill off 4,4-dimethylmetadioxane and 4-methyl-5,6-dihydro-(2H)-pyran from the resinous maleic ester having a boiling point substantially higher than 133° C. at atmospheric pressure.

References Cited by the Examiner
UNITED STATES PATENTS

| | | | |
|---|---|---|---|
| 2,962,507 | 11/1960 | Hellin et al | 260—340.7 |
| 2,997,480 | 8/1961 | Hellin et al. | 260—340.7 |

OTHER REFERENCES

Arundale et al., Chem. Rev., vol. 51 (August-December 1952), pp. 505–511 and 529–531 relied upon.

LEON J. BERCOVITZ, *Primary Examiner.*

MILTON STEARMAN, *Examiner.*

R. W. GRIFFIN, *Assistant Examiner.*